Nov. 14, 1961  H. P. CAUDLE ET AL  3,008,708
PHOTOGRAPHIC VIEWING APPARATUS

Original Filed Feb. 11, 1957  8 Sheets-Sheet 2

HOWARD P. CAUDLE
JOHN H. McGRATH
ROBERT E. THIESER
INVENTORS

BY *Daniel J. Mayne*
*Lloyd F. Beebach*
ATTORNEY & AGENT

Nov. 14, 1961  H. P. CAUDLE ET AL  3,008,708
PHOTOGRAPHIC VIEWING APPARATUS
Original Filed Feb. 11, 1957  8 Sheets-Sheet 3

FIG. 6.

HOWARD P. CAUDLE
JOHN H. McGRATH
ROBERT E. THIESER
INVENTORS

BY

ATTORNEY & AGENT

HOWARD P. CAUDLE
JOHN H. McGRATH
ROBERT E. THIESER
INVENTORS

BY

ATTORNEY & AGENT

Nov. 14, 1961 H. P. CAUDLE ET AL 3,008,708
PHOTOGRAPHIC VIEWING APPARATUS
Original Filed Feb. 11, 1957 8 Sheets-Sheet 6

HOWARD P. CAUDLE
JOHN H. McGRATH
ROBERT E. THIESER
INVENTORS

BY
ATTORNEY & AGENT

Nov. 14, 1961   H. P. CAUDLE ET AL   3,008,708
PHOTOGRAPHIC VIEWING APPARATUS
Original Filed Feb. 11, 1957   8 Sheets-Sheet 7

HOWARD P. CAUDLE
JOHN H. McGRATH
ROBERT E. THIESER
INVENTORS

BY Daniel J. Mayne
Lloyd F. Seebach
ATTORNEY & AGENT

Nov. 14, 1961  H. P. CAUDLE ET AL  3,008,708
PHOTOGRAPHIC VIEWING APPARATUS
Original Filed Feb. 11, 1957  8 Sheets-Sheet 8

HOWARD P. CAUDLE
JOHN H. McGRATH
ROBERT E. THIESER
INVENTORS

BY
ATTORNEY & AGENT

3,008,708
PHOTOGRAPHIC VIEWING APPARATUS
Howard P. Caudle, John H. McGrath, and Robert E. Thieser, Rochester, N.Y., assignors to Eastman Kodak Company, Rochester, N.Y., a corporation of New Jersey
Original application Feb. 11, 1957, Ser. No. 639,560, now Patent No. 2,911,884, dated Nov. 10, 1959. Divided and this application Dec. 12, 1958, Ser. No. 780,162
8 Claims. (Cl. 271—5)

The invention relates to photographic viewing apparatus and more particularly to such apparatus in which the photographic element is moved between several stations, without handling, for purposes of viewing and selecting one or more of several images and perforating indicia thereon to indicate the image selection and is a division of our copending application, Serial No. 639,560, filed February 11, 1957, U.S. Patent No. 2,911,884.

The apparatus described hereinafter is particularly adapted to handle small, discrete pieces of film which are of such size as to be incapable of being manually manipulated. Since the pieces of film are small and each piece of film can contain from two to twelve images arranged in pairs longitudinally of the film, it can be readily appreciated that such film does not readily lend itself to manual handling and orientation. As a result, the present invention provides for automatic manipulation of each photographic element from a supply station to a viewing station, from the viewing station to a perforating station or one of two receiving stations, or from said supply station to one of the receiving stations. To accomplish this movement of each discrete photographic element between the various stations, the operator manipulates a single lever, which is attached to a transport means, with respect to indicated positions. When the lever is successively positioned in the indicated positions in a predetermined order, the photographic element is automatically withdrawn from the supply station for movement by the transport to any one of the other stations. When the transport is moved into the viewing position, the element thereon is automatically transferred to the viewing station, the transport then being withdrawn. Upon reinsertion of the transport into the viewing position, the element is transferred back to the transport. By means of an intermittent drive connected to the viewing station, the element, when positioned therein, is moved in a predetermined pattern to successively align the images on the element with the optical axis of the projection system. During viewing, selection of the images is made and a group of punches are then preconditioned to properly perforate the element. When the element is moved into the perforating station, the punches are activated and the film is perforated. On movement of the transport into relation with respect to one of the receiving stations, the punches are reset and the element is inserted in the receiving station.

The primary object of the invention is, therefore, to provide projection apparatus in which a small photographic element can be completely manipulated and oriented with respect to the optical axis without handling of the element.

Another object of the invention is to provide a projection apparatus in which a transport means serves to move a discrete photographic element between a plurality of spaced stations and in each station actuates means for controlling the transfer of the element with respect to the transport means and the respective station.

Still another object of the invention is to provide a projection apparatus in which the element arranged in the viewing station is moved in a predetermined pattern to successively align the images on the element in a predetermined order with respect to the optical axis.

A further object of the invention is to provide a projection apparatus in which the element to be viewed is withdrawn from a station, is retained on a transport means for movement between several stations and is maintained in a viewing station by vacuum means which is controlled by a series of interlocking relays and sequentially actuated by the transport means.

Yet another object of the invention is to provide a projection apparatus in which control means comprising a plurality of interlocking relays in rendered operable by the transport means in any one of the several stations to permit, respectively, withdrawal of the photographic element from one station, movement and transfer of the element to the viewing station, transfer and movement to either of two receiving stations or to a perforating station and then movement to one of the receiving stations.

And still another object of the invention is to provide a projection apparatus in which the several images on a photographic image can be viewed successively and in a predetermined order, selection of any image or images can be made and, after viewing, designating the images so selected.

Other objects and advantages of the invention will be readily apparent to those skilled in the art by the description which follows.

Reference is now made to the accompanying drawings wherein like reference numerals designate like parts and wherein.

The apparatus herein disclosed and described is merely illustrative of one embodiment or arrangement for illustrating the invention and various other arrangements will be apparent to those skilled in the art by the description which follows. Also, while a specific type of photographic element is utilized, the apparatus can be easily and readily changed to accommodate other types as well as sizes.

Figure 3:
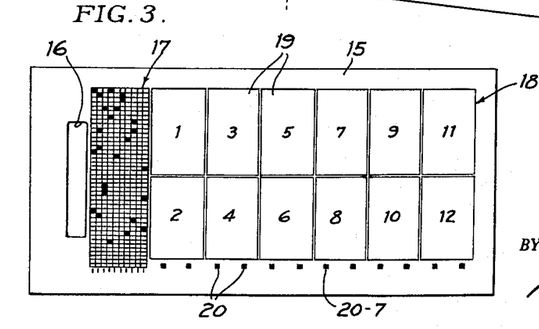
FIG. 3 is an enlarged view of a photographic element used in conjunction with the projection apparatus.

With reference to FIG. 3, the photographic element 15 here disclosed comprises a negative film of a size approximately five-eighths of an inch in width and one and one-quarter inches long. It is readily apparent that such a small piece of film presents a problem if it is to be handled, manipulated or oriented by hand. Such a piece of film is provided with an elongated slot 16 adjacent one edge, has a code area 17 and has an image area 18. The element 15 can contain from one to twelve images 19 and/or from ten to sixty-six columns of code. With sixty-one to sixty-six columns of code, however, the element will contain no images 19. Since the invention is concerned with viewing images 19, the latter case of all code can be discarded. In the element disclosed, it is assumed that an image is equivalent in width to ten columns of code and that at least eight columns of code and not more than fifty-eight columns will be exposed on any element. It will be noted from FIG. 3 that images 19 are arranged in pairs longitudinally of element 15 and that adjacent each pair of images indicia 20 are arranged longitudinally of element 15 and in a predetermined relation to each pair of images 19. As shown in FIG. 3, the indicia to the left under each pair of images 19 indicate the presence of an image in the odd number positions 1–11 whereas the indicia to the right indicate the presence of an image in the even number positions 2–12, e.g., 20–7 indicates the indicium to the left under images 19 numbered 7 and 8. Indicia 20 are utilized in other apparatus to locate and position images 19 in the apparatus as well as serving to indicate the presence of an image. In an enlarger for reproducing images 19, indicia 20 are utilized to indicate the images 19 to be enlarged. This is accomplished by punching out indicia 20 corresponding to the images to be enlarged or the indicia corresponding to images not to be enlarged, the latter case being a negative selection. However, the end result is the same in that only certain images will be enlarged. The apparatus about to be described serves to accomplish this result together with viewing of the individual images successively and in a predetermined order to permit the operator to select the desired images and to identify the selected images.

Figures 1, 2, 4:
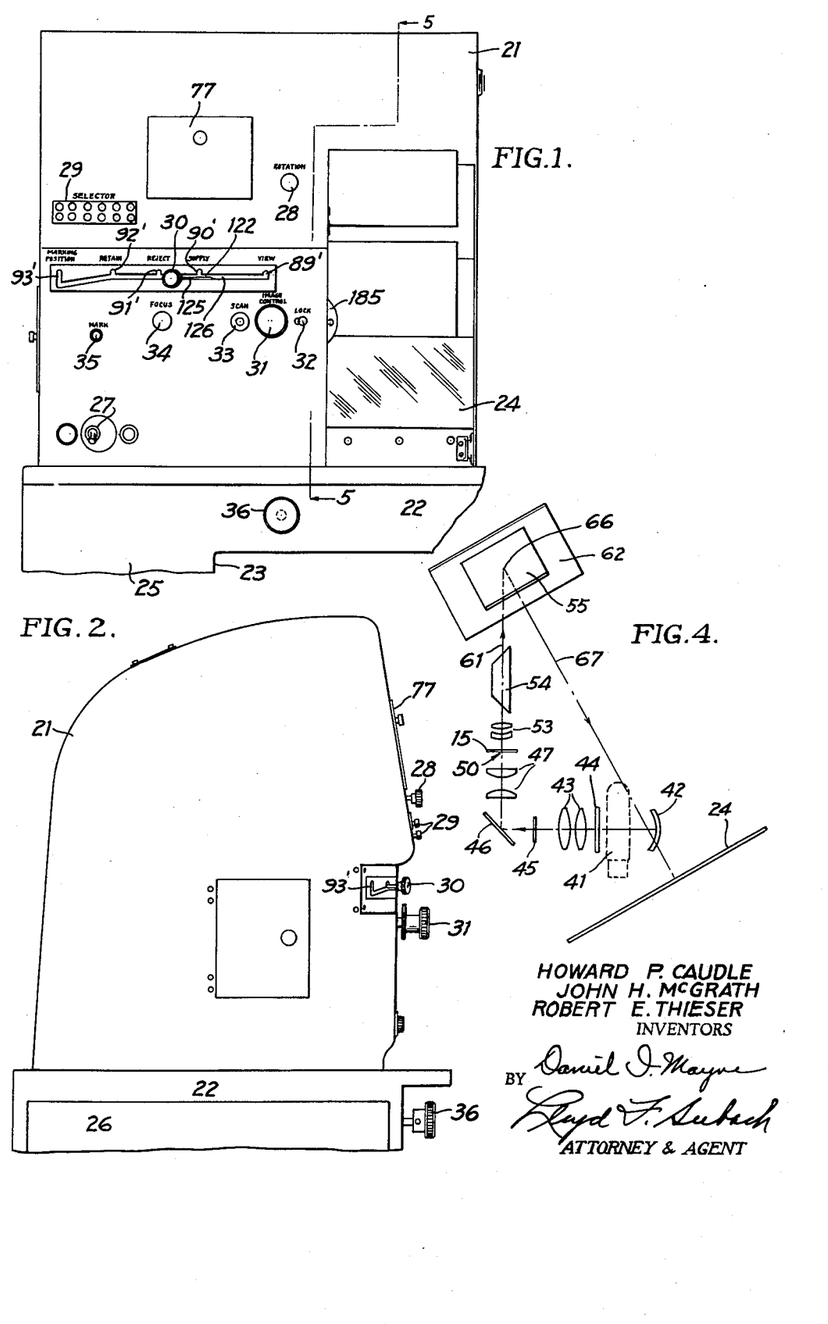
FIG. 1 is a front elevation of the upper portion of the projection apparatus showing the various operating knobs and switches in relation to the viewing screen.
FIG. 2 is a side elevation of the apparatus shown in FIG. 1.
FIG. 4 is a diagrammatic side elevation of the optical system of the projection apparatus.

As shown in FIGS. 1 and 2, the projection apparatus comprises a cabinet 21 which is mounted on a base 22 provided with a knee hole 23 which permits the operator to sit in a position directly in front of screen 24 which is mounted to the rear and to the right side of cabinet 21. The projection system, as well as the element transporting and handling mechanism is contained in cabinet 21. The vacuum means and various electrical controls are contained in the left-hand portion 25 of base 22, these parts being accessible by means of the removable side panel 26. To the left of screen 24 and on the front of cabinet 21, the various operating and control knobs are arranged within reach of the operator. The main switch 27 is located in lower left-hand corner of cabinet 21. Across the central portion of cabinet 21, the projected image can be rotated by knob 28, selection of images is made by the group of selector buttons 29; the element is moved with respect to the several stations by means of knob 30; movement of the element with respect to the optical axis to successively project each image 19 on screen 24 in a predetermined order is accomplished by knob 31; movement of the element for purposes of scanning is accomplished by pushing knob 31 inwardly to release lock button 32 to permit rotation of knob 31 and movement of scan knob 33 independently of each other; by means of knob 34 the optical system is focused to produce a sharp image on screen 24; and button 35 actuates the switch which results in perforating the indicia 20. On the base 22, a knob 36 is arranged on the front thereof to tilt cabinet 21 and thus position screen 24 in the most convenient viewing position for the operator. The function and purpose of the aforementioned control knobs will be more readily apparent from the more detailed description which follows.

Figure 5:
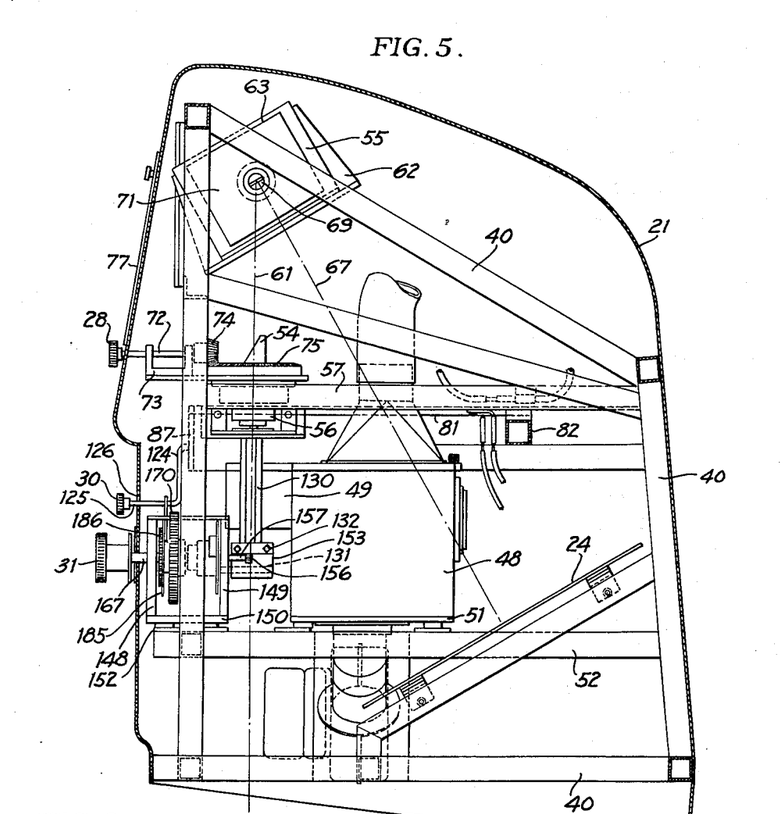
FIG. 5 is a vertical section through the upper portion of the apparatus cabinet taken substantially along line 5—5 in FIG. 1 and with the inner wall removed to show the internal mechanism.
Figure 6:
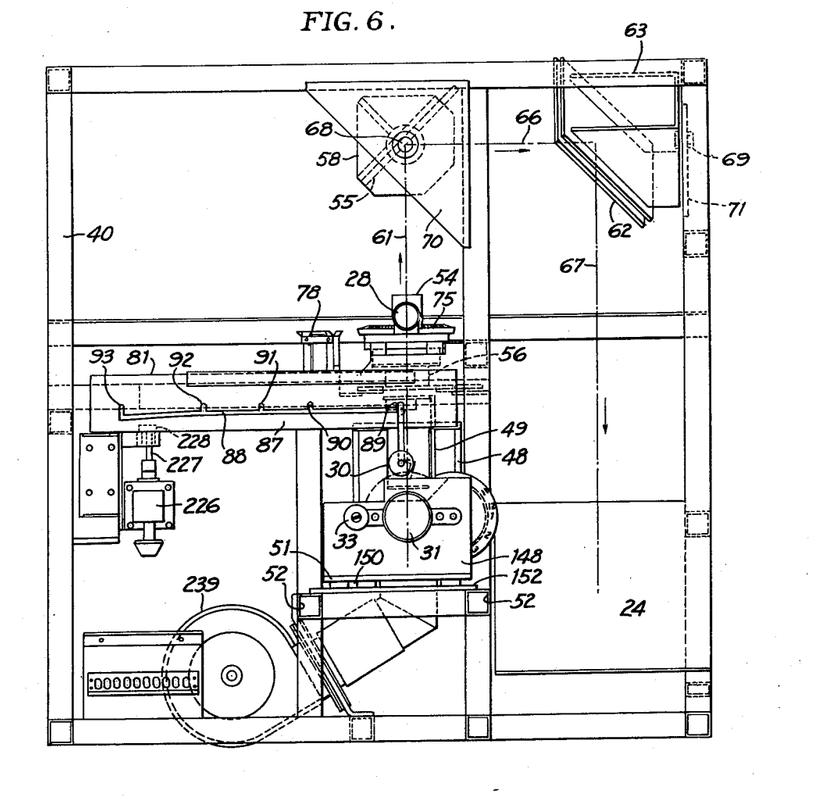
FIG. 6 is a front elevation of the upper portion of the apparatus cabinet with the cabinet removed to show the internal mechanism.

As shown in FIGS. 5 and 6, cabinet 21 surrounds a tubular framework 40 to which various places are fixed to support the mechanism and optical system arranged therein. The optical system, see FIG. 4, comprises a lamp 41, a reflector 42 arranged behind said lamp, a condenser lens system 43 with a heat absorbing plate 44 between system 43 and lamp 41, a field stop 45 and a mirror 46. These elements together with the condenser system 47 are mounted in the housings 48 and 49 below viewing station or film plane 50. Housing 49 is secured to housing 48 which, in turn, is mounted on plate 51 fixed to cross members 52. Projection lens 53, prism 54 and mirror 55 are aligned with condenser system 47, lens 53 and prism 54 being contained in mount 56 which is supported on cross members 57 and mirror 55 being mounted on block 58. Mirror 55 is skewed with respect to axis 61 for directing the projected image to mirror 62 which is mounted on block 63. Mirror 62 is also skewed with respect to axes 66 and 67 for directing the image from mirror 55 to screen 24. Blocks 58 and 63 are pivotally supported at 68 and 69 on plates 70 and 71, respectively, to permit adjustment of said mirrors. With reference particularly to FIG. 5, knob 28 is secured to shaft 72 which is journalled in bracket 73 and extends beyond cabinet 21. The other end of shaft 72 has a pinion 74 fixed thereto, said pinion meshing with gear 75 which forms a part of the mount of prism 54. Accordingly, rotation of knob 28 causes prism 54 to rotate with respect to axis 61 thereby rotating the projected image to place it in the desired relation on screen 24, as is well known in the art. In a similar manner, knob 34 is connected to mount 56 for moving projection lens 53 axially to properly focus the projected image on screen 24.

Figure 8:
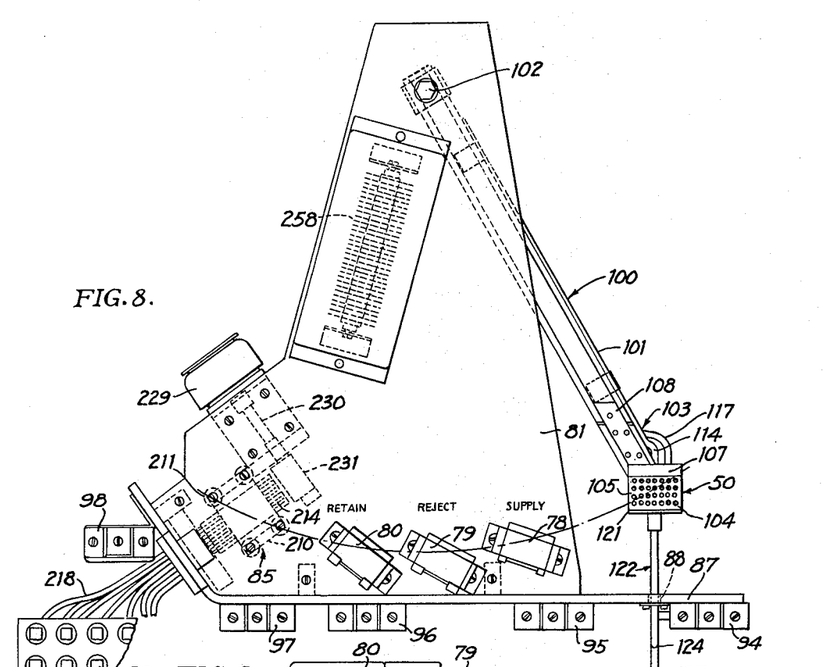
FIG. 8 is a detail plan view showing the spaced relation of the several stations and the transport means; the selector buttons being shown out of their true position.
Figure 9:
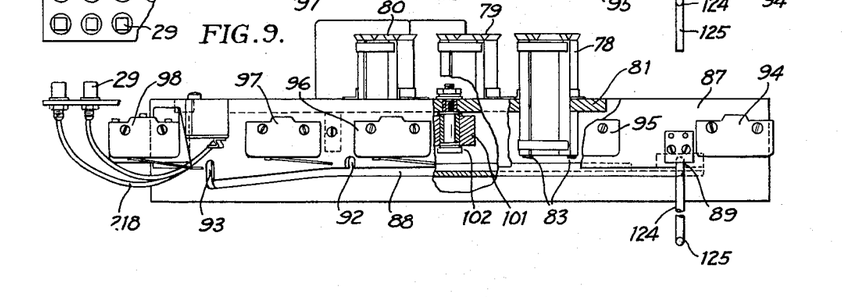
FIG. 9 is a front elevation of the mechanism shown in FIG. 8 showing the relation of the switching means actuated by the transport in its different positions.

Directly over the various control knobs, a hinged panel 77 is arranged to provide access to the interior of cabinet 21 and particularly to supply receptacle 78, reject receptacle 79 and retain receptacle 80 for inserting and withdrawing elements 15 which are retained therein. Said receptacles are mounted on plate 81 which is mounted on members 82, only one of which is shown in FIG. 5. Receptacles 78, 79 and 80 are identical in structure and extend both above and below plate 81, as shown in FIG. 9. These receptacles are arranged in predetermined spaced relation, as shown in FIG. 8, for a purpose to be described. Each receptacle is open at both ends and is provided with lips 83 on the lower end for engaging the marginal edges of the lowermost element 15 to retain a stack of said elements therein, the upper end being flared to permit said elements to be easily inserted therein.

Since elements 15 are of such a small size, the elements are handled in groups by means of a stick which is insertable in the aligned slots 16 and which is provided with releasable means to retain the elements 15 thereon. By means of such a device a plurality of elements can be easily inserted in supply receptacle 78 or withdrawn from receptacles 79 and/or 80. Receptacles 78, 79 and 80 are arranged between viewing station 50 and the perforating station designated broadly by numeral 85.

On the front end of plate 81 a long plate 87 is fixed thereto and extends downwardly therefrom, as shown in FIG. 9. Plate 87 is provided with an elongated horizontal slot 88 and spaced vertical slots 89, 90, 91, 92 and 93 extending vertically upward therefrom. These slots are, respectively, associated with the viewing station, supply receptacle, reject receptacle, retain receptacle and perforating station. Adjacent each of slots 89, 90, 91, 92 and 93, there is a switch arranged with its arm in proper relation to its respective slot, the switches being designated, respectively, by numerals 94, 95, 96, 97 and 98.

Figures 7, 10, 11, 19:
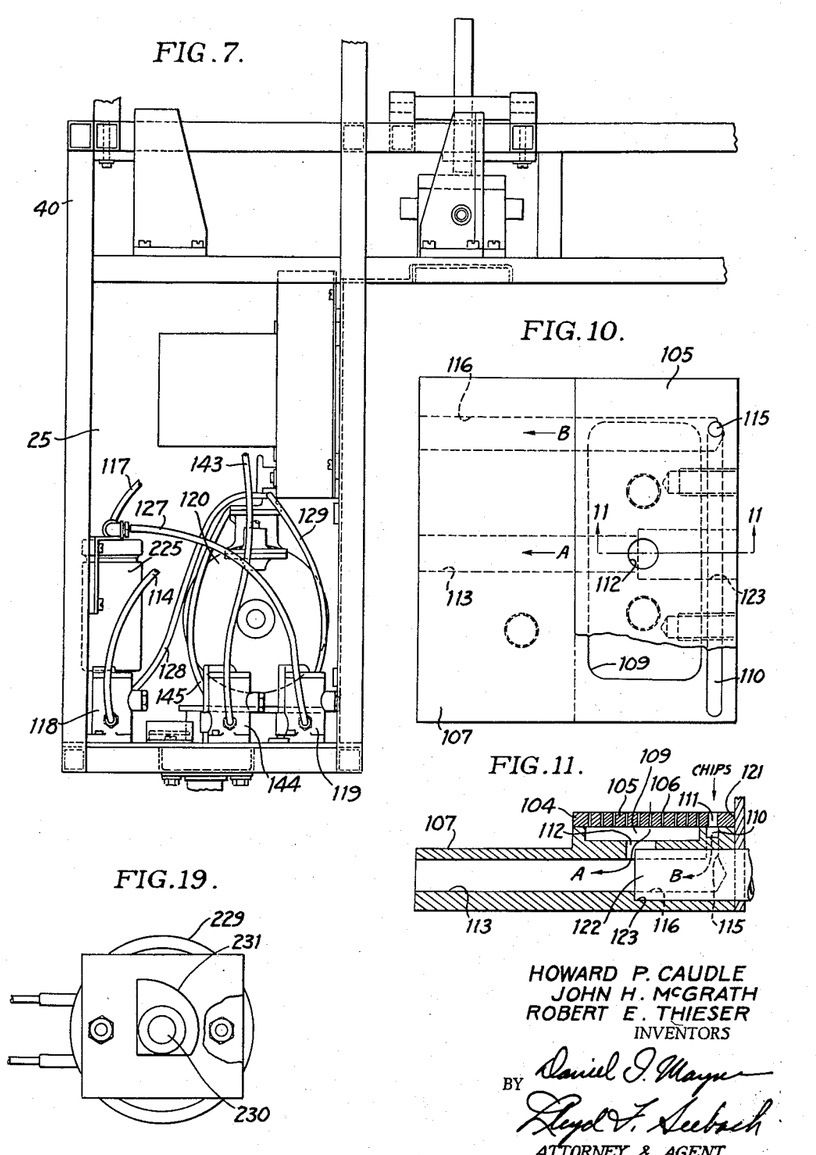
FIG. 7 is a front elevation of the mechanism contained in the lower left-hand portion of the cabinet with the cabinet removed.
FIGS. 10 and 11 are detail plan and sectional views of the perforated portion of the transport means.
FIG. 19 is a detail end view of the punch reset mechanism.

The transport means 100 for withdrawing an element from supply receptacle 78 and for moving the element into said viewing station 50, into said perforating station 85, and for inserting the element into either receptacle 79 or 80 comprises an arm 101 which is pivotally mounted on the under side of plate 81 at 102. The pivotal mount at 102 is a compound pivot arrangement which permits arm 101 to be moved in both a horizontal and a vertical plane. The forward end 103 of arm 101 carries a perforated portion 104 which forms a part of arm 101. Perforated portion 104 comprises a plate 105 which is provided with a plurality of apertures 106 and is mounted over block 107, as shown in FIGS. 10 and 11, block 107 being secured to an extension 108 of arm 101. Block 107 is provided with a recess 109 which lies beneath apertures 106, when in assembled relation with plate 105, as well as a recess 110 below die apertures 111 which are arranged longitudinally of plate 105 in accordance with the arrangement of indicia 20. Recess 109 is connected by intersecting holes 112 and 113 in block 107 to a flexible hose 114. Recess 110 is connected by intersecting holes 115 and 116 in block 107 to flexible hose 117. Hose 114 is connected to solenoid valve 118 and hose 117 is connected to chip jar 225 and by hose 127 to solenoid valve 119, both valves being connected by hoses 128 and 129, respectively, to vacuum pump 120, see FIGS. 7 and 23. On the front wall of block 107, plate 121 is mounted and operating lever 122 has one end extending through plate 121 and into the counterbored portion 123 of hole 113. Lever 122 extends through slot 88 in plate 87, is formed vertically downward at 124 and then extends horizontally at 125 through slot 126 in the front wall of cabinet 21, the outer end of extension 125 carrying knob 30.

From the description thus far, when transport means 100 is moved in a horizontal plane by movement of lever 122 in slots 88 and 126, it is properly positioned with respect to any one of receptacles 78, 79 or 80 upon movement of lever 122 upward into any one of slots 90, 91 or 92. Since block 107 and plate 105 are of dimensions smaller than that of elements 15 and in one dimension smaller than the dimensions between the retaining lips 83, plate 105 and block 107 are moved against and slightly beyond the plane of the lowermost element in the receptacle to insure contact therewith during withdrawal and movement of the element past lips 83 upon insertion. As will be explained more fully hereinafter, when arm 101 and perforated portion 104 are moved into relation with respect to the supply receptacle 78, vacuum pump 120 supplies a vacuum to portion 104 to withdraw the lowermost element past lips 83 and to retain the element over and on plate 105. Since the vacuum is effective to retain element 15 on portion 104, it must be rendered ineffective when it is desired to release the element. Therefore, when transport means 100 is moved upward when in relation to either of slots 91 or 92, the vacuum means is rendered inoperative and the element is retained in the receptacle by lips 83. Because of the pivotal arrangement of transport means 100 and the fact that element 15 should be squarely positioned in the viewing station, see position of transport means 100 in FIG. 8, receptacles 78, 79 and 80 and perforating station 85 must be angularly arranged as shown in this same figure.

Figures 14, 16, 17, 18, 20, 21:
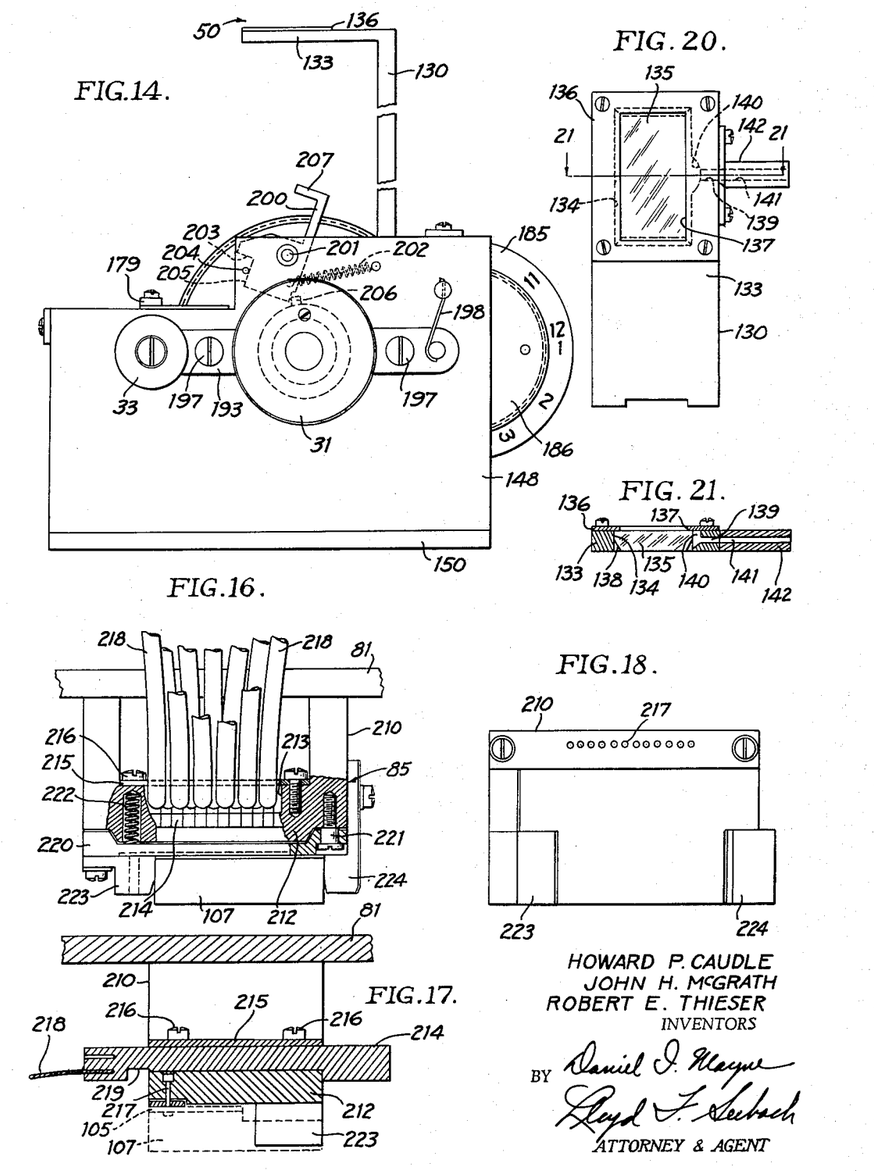
FIGS. 16, 17 and 18 are detail views of the perforating mechanism.
FIGS. 20 and 21 are detail views of the viewing station.

With reference particularly to FIGS. 20 and 21, viewing station 50 comprises a C-shaped bracket 130 which is mounted on parallel rods 131 and 132 for movement in directions normal to each other, as will be described hereinafter. The upper extension 133 of bracket 130 is provided with an aperture 134 in which a glass platen 135 is cemented in position with one face thereof in the plane of the underside of said extension. An aperture plate 136 is secured to the opposite surface and has an aperture 137 corresponding to the image area 18. Glass platen 135 has the four sides thereof bevelled as at 138, and on one side of extension 133 a hole 139 connects with recess 140 which, when an element is positioned against platen 135, provides a channel around said platen. Hole 139 aligns with the hole 141 in adapter 142 which is secured to the side of extension 133. Adapter 142 is connected by a flexible hose 143 to solenoid valve 144 which, in turn, is connected by hose 145 to vacuum pump 120, as shown diagrammatically in FIG. 23.

When an element 15 has been withdrawn from supply receptacle 78 by the perforated portion 104 and transport means 100 is then moved to the right by lever 122 and upward into slot 89, element 15 is then positioned between glass platen 135 and plate 105. At this instant, the vacuum is switched from block 107 to extension 133 to exhaust the air in the channel around platen 135 formed by the bevel thereon, the aperture 134 and element 15. Transport means 100 can, therefore, be moved out of position with respect to viewing station 50 and element 15 is retained in position for projection of the images thereon onto screen 24.

At the forward end of members 52 and adjacent the front wall of cabinet 21, as seen in FIGS. 5, 6 and 12–14, a mechanism is arranged for imparting movement to viewing station 50 for viewing images 19 successively and in a predetermined order. This mechanism is mounted between plates 148 and 149 which are mounted on bottom plate 150 and strips 152 between cross members 52. Extending rearwardly from plate 149 are parallel rods 131 on which block 153 is slidably mounted. Block 153, in turn, carries parallel rods 132 on which the mounting block 154 is slidably mounted. Bracket 130 which carries glass platen 135 is secured to the top of block 154 and housing 49 is arranged between the extension 133 of bracket 130 and block 154. On the underside of block 154, a helical rack 155 is mounted or formed integral therewith and has a helical pinion 156 meshing therewith. Pinion 156 is carried by shaft 157 which is journaled in plate 149 and on the end extending to the other side of plate 149 carries spacer disc 158 and clutch housing 159. Secured to housing 159 by screws 160 is clutch plate assembly 161 comprising tubular sleeve 162, ring 163 and clutch plate 164 which is secured to diametrically opposed carrier pins 165 which are slidably mounted in housing 159 and biased into an engaging position by springs 166. Shaft 167 is journaled in plate 148 and in alignment with shaft 157 by sleeves 168 and 169, sleeve 169 being freely rotatable on said shaft. On the end extending toward shaft 157, sleeve 169 has an assembly fixed thereto comprising a large spur gear 170 to the shoulder 171 of which is secured a gear 172, and a clutch 173 fixed to said sleeve 169 and engageable by clutch plate 164. The end of shaft 167 carries a pin 174 which extends through slot 175 in sleeve 162 and engages clutch plate 164 to move said clutch plate 164 axially against the action of springs 166 to disengage clutch plate 164 from clutch 173 upon axial movement of shaft 167. On the end of shaft 167 extending beyond plate 148, knob 31 is affixed thereto for rotating said shaft. Since clutch plate 164 and clutch 173 are normally engaged, rotation of knob 31 imparts rotation to shaft 157 and pinion 156 causing block 154, bracket 130 and viewing station 50 to be moved along rods 132 to the left or right, depending on the direction of rotation of knob 31.

To the left of knob 31, scan knob 33 is fixed to the end of shaft 176 extending beyond casing 21. Shaft 176 is journaled in plates 148 and 149 and between said plates has a gear 177 fixed thereto which meshes with gear 170 and carries a grooved cam 178. A strap 179, which is fixed to block 153 by screws 180, carries a follower 181 which engages the groove in cam 178. If it is assumed that shaft 176 is not interconnected to shaft 167 by gears 177 and 170, then rotation of shaft 176 will rotate cam 178 which will impart a reciprocatory motion to follower 181, strap 179 and block 153 to move viewing station 50 along rods 131 in a direction at right angles to that imparted by knob 31. However, since rack 155 and pinion 156 intermesh and have helical teeth, this reciprocatory movement of block 153 is resolved into an oblique movement so that the resultant movement is determined by the helical angle of the teeth on rack 155 and pinion 156.

Figures 12, 13, 15:
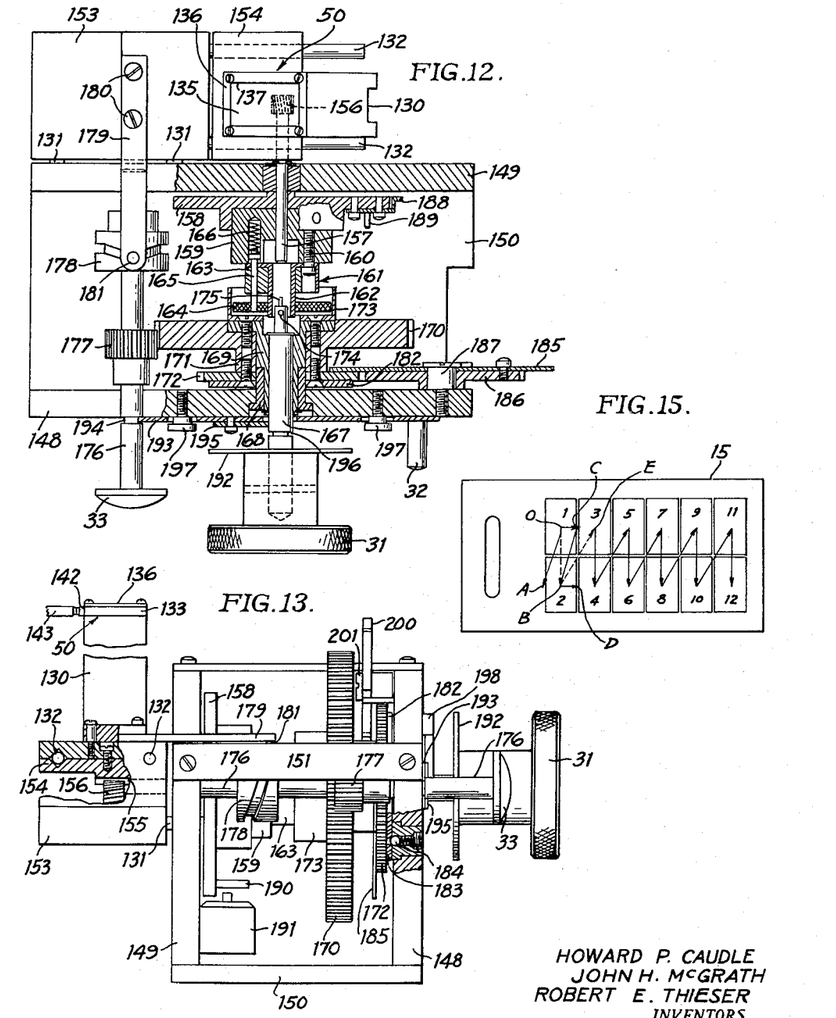
FIGS. 12, 13 and 14 are a horizontal section, front and side elevation views, respectively, of the mechanism for imparting intermittent movement to the viewing station to successively and in a predetermined order align the images with the optical axis.
FIG. 15 is a detail view of a photographic element showing the pattern of movement thereof for aligning the images with the optical axis.

Since gears 170 and 177 intermesh and clutch plate 164 and clutch 173 are normally engaged, rotation of knob 31 serves to drive shafts 167, 157 and 176. With reference to FIG. 15, if it is assumed that viewing station 50 is so positioned that axis 61 is aligned with the center of image 1, then rotation of knob 31 in a clockwise direction will cause pinion 156 and rack 155 to move viewing station 50 to the left. At the same time, gear 170 drives gear 177 and cam 178 is rotated a half turn to move viewing station 50 along rods 131. As mentioned above, however, this movement is resolved into an oblique movement along the teeth of rack 155. The movement due to rack 155 and pinion 156 is designated in FIG. 15 by OC. The oblique movement due to cam 178 and rack 155 is designated by OA. The resultant movement which occurs because both of the previously mentioned movements occur simultaneously is OB. As a result, the center of image 2 is then aligned with axis 61. With further rotation of knob 31, BD represents the movement due to rack 155 and pinion 156 and BC is the movement due to cam 178 and rack 155. The resultant movement is BE which positions the center of image 3 with respect to axis 61. While FIG. 15 designates movement of axis 61 or point O with respect to element 15, it should be evident from the description that element 15 is actually moved with respect to axis 61 or point O. The resultant movements OB and BE serve to position the images successively and in predetermined order with respect to axis 61, as indicated by the pattern of arrows in FIG. 15. These movements are, however, dependent on the chosen helical angle of rack 155 and pinion 156, as well as the reciprocatory movement imparted by cam 178. As a result, by varying either or both of these factors, the resultant movements can be varied in accordance with any necessary requirements.

To provide the operator with a means for sensing the location of an image, gear 172 has a plate 182 fixed thereto, said plate being provided with twelve angularly spaced apertures 183 for engaging the spring-biased ball 184 mounted in plate 148, as shown in FIG. 13. In addition, a visual indication of the image in position with respect to the optical axis is given the operator by means of numerals carried on disc 185 and visible to the operator adjacent screen 24, as shown in FIG. 1. Disc 185 is secured to gear 186 which is freely rotatable on stud 187 mounted in plate 148 and which meshes with gear 172. Also knob 31 is provided with a disc 192 having numerals corresponding to those on disc 185.

The movement of knob 31 and, hence, the movement of viewing station 50 is limited by stop arm 188 which is fixed to disc 158 and which engages a pin 189 extending inwardly from plate 149. The relation of pin 189 and arm 188 is such that knob 31 imparts not quite a full revolution of movement to shafts 157 and 167. Disc 158 also carries a pin 190 which engages switch 191 mounted on the inner surface of plate 149 and retains said switch in a closed position only when viewing station 50 is in position to align image 1 with axis 61.

For purposes of scanning images larger than those indicated on element 15 so that the order of viewing cannot be followed or for rapidly locating a particular image, clutch plate 164 and clutch 173 can be disengaged by moving knob 31 inwardly whereby pin 174 moves clutch plate 164 axially against the action of springs 166, the driving connection between shafts 157 and 167 being retained by pin 174 and slot 175 in sleeve 162 and the driving connection between shafts 157—167 and shaft 176 being broken. When knob 31 is moved inwardly, lock button 32 is moved to the right by spring 198 to disengage the end of slide 193 from the annular recess 194 in shaft 176 and to move retainer 195 on slide 193 into engagement with anular recess 196 on shaft 167 to lock said shaft in position, slide 193 being retained on plate 148 by studs 197 and biased to the right by leaf spring 198. Knob 31 can then be rotated independently of knob 33, which, in turn, can be moved axially and, only axially, independently of knob 31 because knob 33 is freely rotatable on shaft 176. When recess 194 is aligned with the end of slide 193, button 32 can be moved to the left to release shaft 167.

With independent rotation of knob 31 or movement of knob 33, it is necessary to provide means for indicating to the operator that viewing station 50 is properly oriented with respect to the image number indicated on disc 185 so that upon return of the element to the image 1 position the transfer of the element can be properly accomplished. On the inner surface of plate 148, a lever 200 is pivotally mounted on stud 201 and is biased by spring 202 so that surface 203 thereof will normally abut pin 204, lever 200 being maintained in the position shown in FIG. 14 in which surface 205 abuts pin 204 by pin 206 on the shoulder 171 of gear 170 when viewing station 50 is properly positioned with respect to axis 61 so that image 1 is aligned with said axis. This is the normal position and the only position in which an element can be transferred to and from viewing station 50. In this position, discs 185 and 192 will indicate image 1, and the end 207 of lever 200 will permit movement of transport means 100 into relation with respect to viewing station 50. With rotation of knob 31 to position image 2, pin 206 is moved with gear 170 and permits spring 202 to move lever 200 so surface 203 abuts pin 204, and end 207 is positioned to prevent movement of transport means 100 into relation with respect to viewing station 50, that is, to prevent the entry of lever 122 into slot 89 and the actuation of switch 94. In order to reinsert transport means 100 in viewing station 50, it is therefore necessary to return pin 206 to its normal position in order to rock lever 200 into the position in which end 207 is removed from the path of vertical movement of lever 122 into slot 89.

Since knob 33 is freely rotatable on shaft 176, shaft 176 can only be moved axially so that any previous movement of disc 185 does not disturb the image number indicated. If clutch plate 164 and clutch 173 are subsequently disengaged and knob 31 is rotated, gears 170, 172 and 186 do not turn due to the keying effect of ball 184 in engagement with plate 182. If the operator disengages clutch plate 164 and clutch 173 when image 4 is in position with respect to axis 61 and then performs the scanning operation, it is possible to inadvertently engage clutch plate 164 and clutch 173 in any position of knob 31. For example, the disc 185 may indicate the image 4 position and the disc 192 may indicate the image 6 position when clutch engagement takes place. If the operator now turns knob 31 in the direction to position image 1 wtih respect to axis 61, stop arm 188 will arrest motion of knob 31 when disc 185 indicates image 1 and disc 192 indicates image 3. Since knob 31 cannot be turned, the operator, upon checking disc 185 against disc 192, realizes that the clutch must again be disengaged in order to adjust both discs to the same image indication in order to phase the operation. This condiution will also be evident to the operator because end 207 will prevent movement of transport means 100 into position with respect to the viewing station. On the other hand, if the clutch is reengaged with disc 192 indicating image 2, then on rotation of knob 31 to reset viewing station 50, pin 206 will move lever 200 so that surface 205 abuts pin 204 to arrest knob 31, end 207 permitting transport means 100 to be moved upward in slot 89. However, in this position disc 185 will indicate image 3 and transfer of element 15 cannot be effected because pin 190 on disc 158 has not closed switch 191. In this case the clutch must be disengaged and knob 31 rotated until discs 185 and 192 indicate image 3 and at that time is then returned to the image 1 position upon further rotation of knob 31.

From the description thus far, it is evident that the mechanism for moving viewing station 50 and, hence, element 15 normally provides an intermittent type of motion which successively and in a predetermined order presents each image in relation to the optical axis for projection and viewing. Also, by means of the controls associated therewith, it is impossible to effect transfer of an element 15 from transport means 100 to viewing station 50, or vice versa, without station 50 being aligned in a predetermined position with respect to optical axis 61.

As noted hereinbefore, selection of images can be accomplished by perforating or punching out the indicia corresponding to the desired images or by punching out the indicia corresponding to the images not desired, that is, by making a negative selection. The latter method of a negative selection is desirable in the event the indicia are to be utilized in other apparatus which handles the elements after the selection has been made. In the description which follows, therefore, it will be assumed that a negative selection is being made, although this does not effect the function nor the result attained by the mechanism to be described.

As shown in FIG. 8, perforating station 85 is arranged to the left of the group of receptacles 78, 79 and 80 and is mounted on the under side of plate 81. With reference to FIGS. 16, 17 and 18, perforating station 85 comprises a U-shaped bracket 210 which is suspended from plate 81 and secured by screws 211. The central portion 212 of bracket 210 is provided with a recess 213 in which twelve slides 214 are mounted side by side and retained in position by plate 215 which is secured to bracket 210 by screws 216. At one end of portion 212, as seen in FIG. 17, a punch member 217 is aligned with each slide 214, the arrangement of punches 217 being in accordance with the spacing of indicia 20 along the image area 18 of element 15. On cabinet 21 to the left and above knob 31, a group of twelve selector buttons 29 are arranged and numbered. Each of said buttons 29 is connected to its respective slide 214 by a flexible cable 218 so that, when viewing the image projected on the screen 24, the operator will merely push in the button 29 corresponding to the image number appearing on disc 185, if reproduction of the image is desired. Movement of any button 29 will move its respective slide 214 to the right, as viewed in FIG. 17, to position notch 219 over its respective punch 217. Immediately below and spaced slightly from bracket 210, a stripper plate 220 is mounted thereto by shouldered studs 221 and maintained in the spaced relation by springs 222. To bracket 210, see FIGS. 16 and 17, guide blocks 223 and 224 are secured for properly positioning transport means 100 and particularly block 107 and plate 105. As transport means 100 is moved by knob 30 and operating lever 122 along slots 88 and 126, it will be noted that said slots are inclined downwardly at the left end for the purpose of moving plate 105 and block 107 on arm 101 below guide blocks 223 and 224 in order that movement of lever 122 into slot 93 will position element 15 in proper relation to punches 217. As lever 122 is moved upward, switch 98 is closed to energize solenoid valve 144 to connect vacuum pump 120 to recess 110 for removing the perforations to chip jar 225. When transport means 100 has been positioned in perforating station 85, button switch 35 is momentarily closed to energize solenoid 226 arranged below perforating station 85, as seen in FIG. 6. The upper end of armature 227 is provided with a rubber cap 228 and, upon energization of solenoid 226, armature 227 moves upwardly and cap 228 strikes the bottom of block 107 to move transport means 100 and element 15 against punches 217 to perforate or punch out the indicia 20 aligned with the slides 214 which have not been moved to the right. Punches 217 associated with the actuated slides 214 are merely moved upward into their respective notch 219 upon contact with element 15 and the indicia aligned therewith are not perforated.

In order to reset slides 214 and punches 217, a rotary solenoid 229 is mounted on the under side of plate 81, as shown in FIG. 8. By means of shaft 230 connected to solenoid 229, cam 231 is rotated into engagement with the ends of slides 214 and moves all of the actuated slides into their normal retaining position upon energization of said solenoid. The inclined edge of notch 219 then moves its respective punch 217 into its normal extended position. Solenoid 229 is energized when transport means 100 is removed from perforating station 85 and moved upward in slot 92 thereby closing switch 97.

Figure 22:
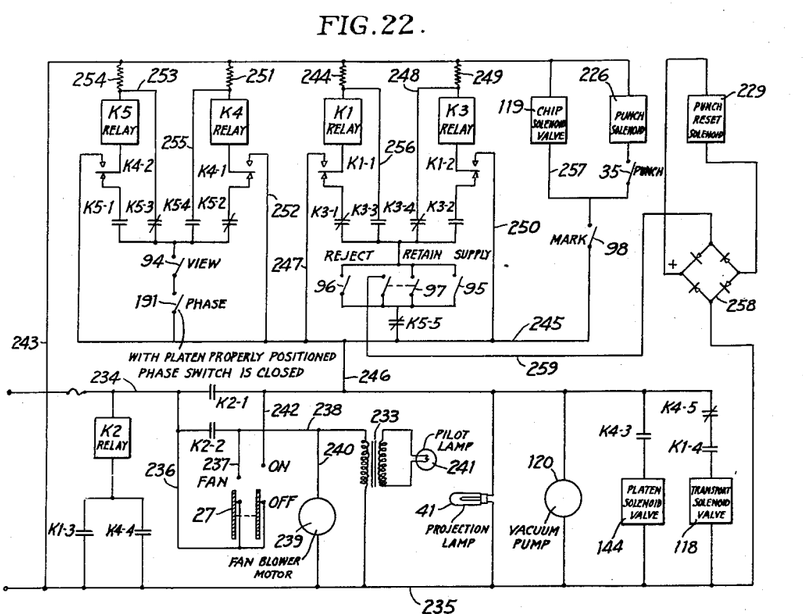
FIG. 22 is a schematic wiring diagram showing the interlocking arrangement of relays for controlling the sequential application of the vacuum means.
Figure 23:
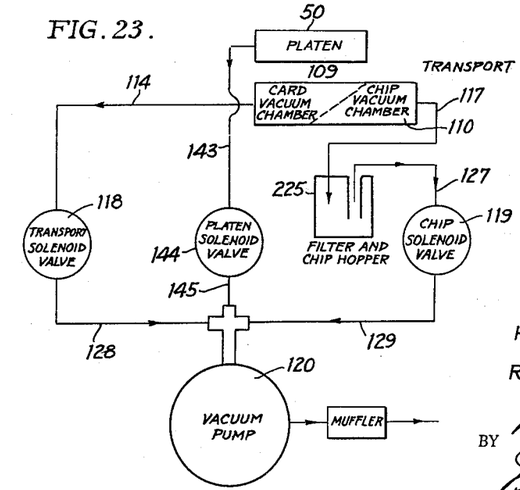
FIG. 23 is a schematic view showing the connections of the vacuum means.

In order to more fully describe the sequence of operation of the apparatus described as well as the means for controlling the sequence of operation, it is believed that this can best be accomplished in connection with the schematic wiring diagram, as shown in FIG. 22, and the schematic diagram of the vacuum system, as shown in FIG. 23. If it is assumed that the viewing station 50 is properly positioned with respect to axis 61, that transport means 100 is positioned at some point in slot 126 between stations and that discs 185 and 192 indicate image 1, then switch 191 will be closed by pin 190 on spacer disc 158. On opening panel 77, a plurality of elements are positioned in supply receptacle 78 by means of a stick and when properly retained by lips 83, the stick is removed and panel 77 is closed. Switch 27 on the front of cabinet 21 is first moved through the "Fan" position in which transformer 233 is connected across lines 234 and 235 by line 236, switch 27, line 237 and line 238, blower motor 239 in line 240 is also energized, and pilot lamp 241 indicates that power is on. As switch 27 is moved into the "On" position, projection lamp 41 and vacuum pump 120 are connected across lines 234 and 235 via line 236, switch 27 and line 242, blower motor 239 and transformer 233 also being maintained by switch 27. Transport means 100 is then moved by knob 30 along slots 126 and 88 until aligned with vertical slots 90 and 90' designating "Supply." As operating lever 122 is moved vertically into slots 90 and 90', switch 95 is actuated to a closed position to complete a circuit through relay K1 via line 235, line 243, resistance 244, relay K1, contact K1–1, contact K3–1, switch 95, contact K5–5, line 245 and line 246 to line 234. With the energization of relay K1, contact K1–1 switches to hold in relay K1 via line 247, line 245 and line 246; contact K1–2 switches but relay K3 is shorted out via line 248 and contact K3–4; contact K1–3 closes to place relay K2 across lines 234 and 235 and closes contacts K2–1 and K2–2 thereby maintaining transformer 233, blower motor 239, projection lamp 41 and vacuum pump 120 by by-passing switch 27; and contact K1–4 closes to connect solenoid valve 118 across lines 234 and 235. With the energization of valve 118, the vacuum is applied to recess 109 in block 107 on arm 101 at the instant plate 105 engages the lowermost element in receptacle 78. Plate 105 is moved a small distance into receptacle 78 and beyond the plane of lips 83 to insure intimate contact with the element to be withdrawn. As transport means 100 is lowered in slots 90 and 90', the element 15 is retained in position on plate 105 by the vacuum and is bowed past lips 83. When operating lever 122 again enters slots 126 and 88, switch 95 opens whereby relay K3 is energized via line 235, line 243, resistance 249, contact K1–2, line 250, line 245, and line 246 to line 234. With the energization of relay K3, contacts K3–1 and K3–4 open and contacts K3–3 and K3–2 close.

Transport means 100 with an element 15 retained thereon is then moved into position with respect to viewing station 50, that is knob 30 and operating lever 122 are aligned with slot 89' on the front wall of cabinet 21 designated "View." As lever 122 is moved upwardly into slots 89 and 89', lever 122 actuates switch 94 to a closed position, lever 200 being positioned to permit this movement. If viewing station 50, as described in conjunction with the mechanism for moving the viewing station, is properly positioned, phasing switch 191 will be closed. If switch 191 is not closed, the element 15 on plate 105 cannot be transferred to the viewing station. With both switches 94 and 191 closed, element 15 is then positioned against glass platen 135 and relay K4 is energized via line 235, line 243, resistance 251, contact K4–1, contact K5–2, switches 94 and 191, line 245, and line 246 to line 234. With the energization of relay K4, contact K4–1 switches to lock in said relay via line 252; contact K4–2 switches but relay K5 is shorted out via line 253 and contact K5–3; contact K4–3 closes to connect solenoid valve 144 across lines 234 and 235 to apply the vacuum to viewing station 50; contact K4–4 closes; and contact K4–5 opens to deenergize solenoid valve 118 to cut off the vacuum to recess 109 in block 107 in arm 101. As a result of the transfer of the vacuum from transport means 100 to viewing station 50, element 15 is transferred therewith. After this transfer of element 15, transport means 100 is moved downwardly in slots 89 and 89' to any intermediate position along slots 88 and 126. On movement out of slots 89 and 89', switch 94 returns to its open position and relay K5 is then energized via line 235, line 243, resistance 254, contact K4–2, line 245, and line 246 to line 234. Energization of relay K5 causes contacts K5–1 and K5–4 to close and contacts K5–2, K5–3 and K5–5 to open. With contact K5–5 open, inadvertent movement of transport means 100 into and out of any one of receptacles 78, 79 or 80 will not disturb the element being retained in the viewing station nor will it be possible to withdraw another element from supply receptacle 78.

When an element 15 is positioned in viewing station 50, image 1 thereon will be projected upon the screen and both discs 185 and 192 will indicate this same image number. Knob 31 is then turned by the operator and the images are projected successively and in predetermined order onto screen 24. The first movement of knob 31 moves pin 190 away from switch 191 to permit said switch to open so that movement of the transport means 100 into viewing station 50 will not affect any transfer of the vacuum or element 15. The operator then pushes one or more of buttons 29 inwardly in accordance with the image number and the image or images desired. Actuation of any of buttons 29 moves the respective slides 214 into a position in which notch 219 is over its respective punch member 217. After all of the images have been viewed and the selection of images desired has been made, knob 31 is rotated in the opposite direction until discs 185 and 192 again indicate that image 1 is aligned with axis 61, switch 191 again being closed by pin 190 when viewing station 50 is in its predetermined position. The possibilities of misphasing which can occur upon disengagement of the clutch for purposes of scanning have been described above in connection with the mechanism for moving viewing station 50.

With viewing station 50 in its original position, transport means 100 is reinserted in position with respect to said viewing station and upon upward movement into slots 89 and 89' lever 122 again actuates switch 94 to a closed position to short out relay K4 via line 255 and contact K5–4. By deenergization of relay K4, contact K4–1 switches to its normal position; contact K4–2 switches to its normal position but relay K5 is maintained through contact K5–1; contact K4–3 opens to deenergize solenoid valve 144 to cut off the vacuum to viewing station 50; contact K4–4 opens; and contact K4–5 closes to energize solenoid valve 118 to apply the vacuum to transport means 100, thereby transferring element 15 to said transport means and overlying plate 105. Upon movement of transport means 100 out of position with respect to viewing station 50, lever 122 again permits switch 94 to open, thereby deenergizing relay K5 to open contacts K5–1 and K5–4 and to close contacts K5–2, K5–3 and K5–5.

If the operator has determined that no images are desired, transport means 100 is then moved into position with respect to "Reject" slot 91' whereas if certain images are desired, said transport means is positioned with respect to "Marking Position" slot 93'. In the former case, movement of transport means 100 into slots 91 and 91' actuates switch 96 into its closed position as element 15 is moved through the open end of receptacle 79 and past lips 83 by plate 105 and block 107 on arm 101. Relay K1 is then shorted out via line 256, contact K3–3, switch 96 and contact K5–5. With deenergization of relay K1, contact K1–1 switches to its normal position; contact K1–2 switches to its normal position and relay K3 is then maintained via contact K1–2 and K3–2; contact K1–3 opens to deenergize relay K2, thereby opening contacts K2–1 and K2–2; and contacts K1–4 opens to cut off the vacuum to block 107. As transport means 100 is moved downwardly and out of slots 91 and 91', switch 96 is opened and relay K3 is deenergized to close contacts K3–1 and K3–4 and to open contacts K3–2 and K3–3. The circuits are now in their original condition and transport means 100 can again be moved into position with respect to the supply receptacle for withdrawing another element therefrom for viewing. It should be pointed out at this point that contacts K1–1, K1–2, K4–1 and K4–2 are "make-before-break" contacts and it is for this reason that relays K3 and K5 are maintained in an energized state after the contacts have been switched.

If it is assumed after viewing that images 3, 4, 6, 9 and 10 are desired, then the operator will not have pushed buttons 1, 2, 5, 7, 8, 11 and 12. As a result, punches 217 corresponding to images 3, 4, 6, 9 and 10 will have notches 219 positioned thereover. Transport means 100 will, therefore, be moved to the end of slots 88 and 126 and under slots 93 and 93'. Upon movement of lever 122 upward, block 107 and plate 105 will be positioned between guide blocks 223 and 224 and die apertures 106 will be aligned with punches 217 with element 15 between plate 105 and stripper plate 220. The upward movement of lever 122 actuates switch 98 to a closed position in which chip solenoid valve 119 is energized via line 235, line 257, switch 98, line 245 and line 246 to line 234. Solenoid valve 119 applies the vacuum to recess 110 in block 107 for removing the perforations to chip jar 225. When transport means 100 is positioned in perforating station 85, the operator actuates switch 35 momentarily to energize solenoid 226 through switches 35 and 98. Armature 227 of solenoid 226 moves upward upon energization and cap 228 thereon strikes the bottom of block 107 to move block 107, plate 105, element 15 and stripper plate 220 toward the bottom 212 of bracket 210 against the action of springs 222 to force punches 217 through element 15. Punches 217 corresponding to indicia 20 indicating images 3, 4, 6, 9 and 10, as assumed, will not perforate element 15 because of notches 219 thereover and element 15 will merely move these particular punches into their corresponding recesses. Since solenoid 226 is only momentarily energized, transport means 100 is immediately released. Because this particular element 15 contains selected images, the element is to be positioned in the retain receptacle 80. The transport means is, therefore, returned to slots 88 and 126, thereby opening switch 98 and cutting off the vacuum to recess 110 in block 107. The vacuum is still being applied, however, to recess 109 to retain the element over plate 105. As transport means 100 is moved upward in slots 92 and 92', lever 122 closes double-pole switch 97 to connect rectifier 258 across lines 234 and 235 via line 259, one side of switch 97, contact K5–5, line 245 and line 246. Rectifier 258 then supplies a D.C. potential to rotary solenoid 229 which rotates cam 231 to reset the actuated slides 214 and their respective punches 217 into their normal perforating position. As described above with respect to reject receptacle 79 element 15 is moved past lips 83 in retain receptacle 80, relay K1 is shorted out by contact K3–3 and relay K2 is deenergized as well as solenoid valve 118 which cuts off the vacuum. Transport means 100, upon return to slots 88 and 126, releases switch 97 and relay K3 is deenergized and rectifier 258 is cut out.

If the operator knows that one or a group of elements contain images, all of which are desired, the elements can be moved successively from supply receptacle 78 to retain receptacle 80 directly without going through the viewing operation. Likewise, elements 15 can be moved directly to reject receptacle 79. In view of the above description, it is believed not to be necessary to describe the circuitry therefor, except to explain that with these procedures only relays K1, K2 and K3 will be involved.

Since other modifications of the invention will be apparent to those skilled in the art, the foregoing description is deemed to be only illustrative of the invention, the scope of which is defined by the appended claims.

Having now particularly described our invention, what we desire to secure by Letters Patent of the United States and what we claim is:

1. In a device for moving a discrete element from a first station in which a plurality of elements are retained in superposed relation to a second station spaced from and in a predetermined relation to said first station and in which said element is retained and arranged on a supporting surface with respect to an axis normal to the plane of said element, comprising a transport means pivotally mounted for movement in planes normal to each other and with respect to said stations, carrier means mounted on said transport means for receiving and positioning an element thereon, vacuum means operatively connected to said carrier means for retaining an element thereon and to said second station for retaining said element on said supporting surface, a first control means arranged adjacent said first station and actuated by said transport means, upon movement thereof into relation with respect to said first station for rendering said vacuum means effective to withdraw an element from said first station and to retain said element on said carrier means during movement thereof between said first station and said second station, and a second control means arranged adjacent said second station and actuated by said transport means, upon movement thereof into relation with respect to said second station, for switching said vacuum means to said second station to transfer said element from said carrier means to said supporting surface.

2. In a device for moving a discrete element from a first station in which said element is retained on a supporting surface and positioned in a predetermined relation to an axis normal to said element to a second station spaced from and in a predetermined relation to said first station for receiving said element, comprising a transport means pivotally mounted for movement in planes normal to each other and with respect to said stations, carrier means mounted on said transport means for receiving and positioning an element thereon, vacuum means operatively connected to said first station for normally retaining said element on said supporting surface and to said carrier means for retaining an element thereon, control means arranged adjacent said first station and actuated by said transport means, upon movement thereof into relation with respect to said first station and said supporting surface and only when said element is in said predetermined relation to said axis, for switching said vacuum means to said carrier means to transfer said element from said supporting surface to said carrier means for movement to said second station.

3. In a device for moving a discrete element from a first station in which said element is retained on a supporting surface and positioned in a predetermined relation to an axis normal to said element to a second station spaced from an in a predetermined relation to said first station for receiving said element, comprising a transport means pivotally mounted for movement in planes normal to each other and with respect to said stations, carrier means mounted on said transport means for receiving and positioning an element thereon, vacuum means operatively connected to said first station for normally retaining said element on said supporting surface and to said carrier means for retaining an element thereon, a first control means arranged adjacent said first station and actuated by said transport means, upon movement thereof into relation with respect to said first station and said supporting surface and only when said element is in said predetermined relation to said axis, for switching said vacuum means to said carrier means to transfer said element from said supporting surface to said carrier means for movement to said second station, and a second control means arranged adjacent said second station and actuated by said transport means, upon movement thereof into relation with respect to said second station, for rendering said vacuum means ineffective to permit transfer of said element into said second station.

4. In a device for moving a discrete element from a first station in which a plurality of elements are retained in superposed relation to a second station spaced from and in a predetermined relation to said first station and in which said element is arranged on a supporting surface and with respect to an axis normal to the plane of said element, comprising a transport means pivotally mounted for movement in planes normal to each other and with respect to said stations, carrier means mounted on said transport means for receiving and positioning an element thereon, vacuum means operatively connected to said carrier means for retaining an element thereon and to said second station for retaining an element on said supporting surface, a first control means arranged adjacent said first station and actuated by said transport means, upon movement thereof into relation with respect to said first station, for rendering said vacuum means effective with respect to said carrier means to withdraw an element from said first station and to retain said element thereon during movement of said transport means between said station, and a second control means arranged adjacent said second station and actuated by said transport means, upon movement thereof into relation with respect to said second station and said supporting surface, for switching said vacuum means from said carrier means to said second station to effect transfer of said element to said supporting surface.

5. In a device for moving a discrete element from a first station having open ends and lips adjacent one open end for retaining the elements in superposed relation therein to a second station arranged in predetermined spaced relation to said first station and having a supporting surface in substantially the same plane as the one open end of said first station, comprising a transport arm pivotally mounted at one end thereof for movement in planes normal to each other and with respect to said stations, a carrier block secured to the other end of said transport arm and having a portion thereof receivable by said one open end of said first station and provided with a plurality of apertures for receiving and positioning an element arranged thereover, vacuum means operatively connected to said apertures for retaining an element on said portion of said carrier block and to said second station for retaining an element on said supporting surface, a first control means arranged adjacent said first station and actuated by said transport arm, upon movement thereof into relation with respect to said first station and insertion of said portion into said open end and into engagement with the lowermost element in said first station, for rendering said vacuum means effective to withdraw said lowermost element past said lips and to retain said element on said carrier block during movement of said transport arm between said first and second stations, and a second control means arranged adjacent said second station and actuated by said second transport arm, upon movement thereof into relation with respect to said second station and said supporting surface, for switching said vacuum means to said second station to transfer said element from said carrier means to said supporting surface.

6. In a device for moving a discrete element from a first station in which said element is retained on a supporting surface and positioned in a predetermined relation to an axis normal to said element to a second station in predetermined spaced relation to said first station and having open ends and lips adjacent one of the open ends for retaining the elements in superposed relation therein, comprising a transport arm pivotally mounted at one end thereof for movement in planes normal to each other and with respect to said stations, a carrier block secured to the other end of said transport arm and having a portion thereof receivable by said one open end and provided with a plurality of apertures for receiving and positioning an element arranged thereover, vacuum means operatively connected to said first station for normally retaining said element and to said apertures for retaining an element on said portion, a first control means arranged adjacent said first station and actuated by said transport arm, upon movement thereof into relation with respect to said first station and said supporting surface and only when said element is in said predetermined relation to said axis, for switching said vacuum means to said apertures to effect transfer of said element from said supporting surface to said portion, and a second control means adjacent said second station and actuated by said transport arm, upon movement thereof into relation with respect to said second station and insertion of said portion into said one open end for rendering said vacuum means ineffective to permit retention of said element by said lips when said portion is withdrawn from said one open end.

7. In a device for moving a discrete element from a first station in which a plurality of elements are retained in superposed relation to any one of a group of stations arranged in substantially the same plane as said first station and in predetermined spaced relation with respect to said first station, comprising a transport means pivotally mounted for movement in planes normal to each other and with respect to said stations, carrier means mounted on said transport means for receiving and positioning an element thereon, vacuum means operatively connected to said carrier means for retaining an element thereon, control means arranged adjacent to said first station and actuated by said transport means, upon movement thereof into relation with respect to said first station, for rendering said vacuum means effective to withdraw an element from said first station and to retain said element on said carrier means during movement of said transport means from said first station to any station in said group of stations, and control means arranged adjacent to each of said stations in said group of stations and actuated by said transport means, upon movement thereof into relation with respect to any one of said group of stations, for rendering said vacuum means ineffective to transfer said element from said carrier means to said one station.

8. In a device for moving a discrete element from a supply station having open ends and lips adjacent one open end for retaining the elements in superposed relation therein, to any one of a group of open end stations arranged in predetermined spaced relation to said supply station, each of the stations in said group having open ends and lips adjacent one open end for retaining any element inserted therein, and all of the stations having the one open end and lips arranged in substantially the same plane, comprising a transport arm pivotally mounted at one end thereof for movement in planes normal to each other and with respect to said supply station and said group of stations, a carrier block secured to the other end of said transport arm and having a portion thereof receivable by said one open end of said stations and provided with a plurality of apertures for receiving and positioning an element arranged thereover, vacuum means operatively connected to said carrier block for retaining an element on said portion of said carrier block, control means arranged adjacent said supply station and actuated by said transport arm, upon movement thereof into relation with respect to said supply station and insertion of said portion into the one open end of said supply station and into engagement with the lowermost element therein, for rendering said vacuum means effective to withdraw said lowermost element past said lips and to retain said element on said carrier block during movement of said transport arm from said supply station to any one of said group of stations, and control means arranged adjacent each station in said group of stations and actuated by said transport arm, upon movement thereof into relation with respect to any one of said group of stations and insertion of said portion into the one open end thereof, for rendering said vacuum means ineffective to permit retention of said element by said lips upon withdrawal of said portion from said one open end.

References Cited in the file of this patent

UNITED STATES PATENTS

| | | |
|---|---|---|
| 2,294,273 | Baxbaum | Aug. 25, 1942 |
| 2,296,152 | Downing | Sept. 15, 1942 |
| 2,335,064 | Kabel | Nov. 23, 1943 |
| 2,811,352 | Bornemann | Oct. 29, 1957 |